Jan. 21, 1969          R. D. KELLER                3,422,533
                      DENTAL PLATE KNIFE
Filed Aug. 22, 1966                          Sheet 1 of 2

INVENTOR
ROBERT D. KELLER

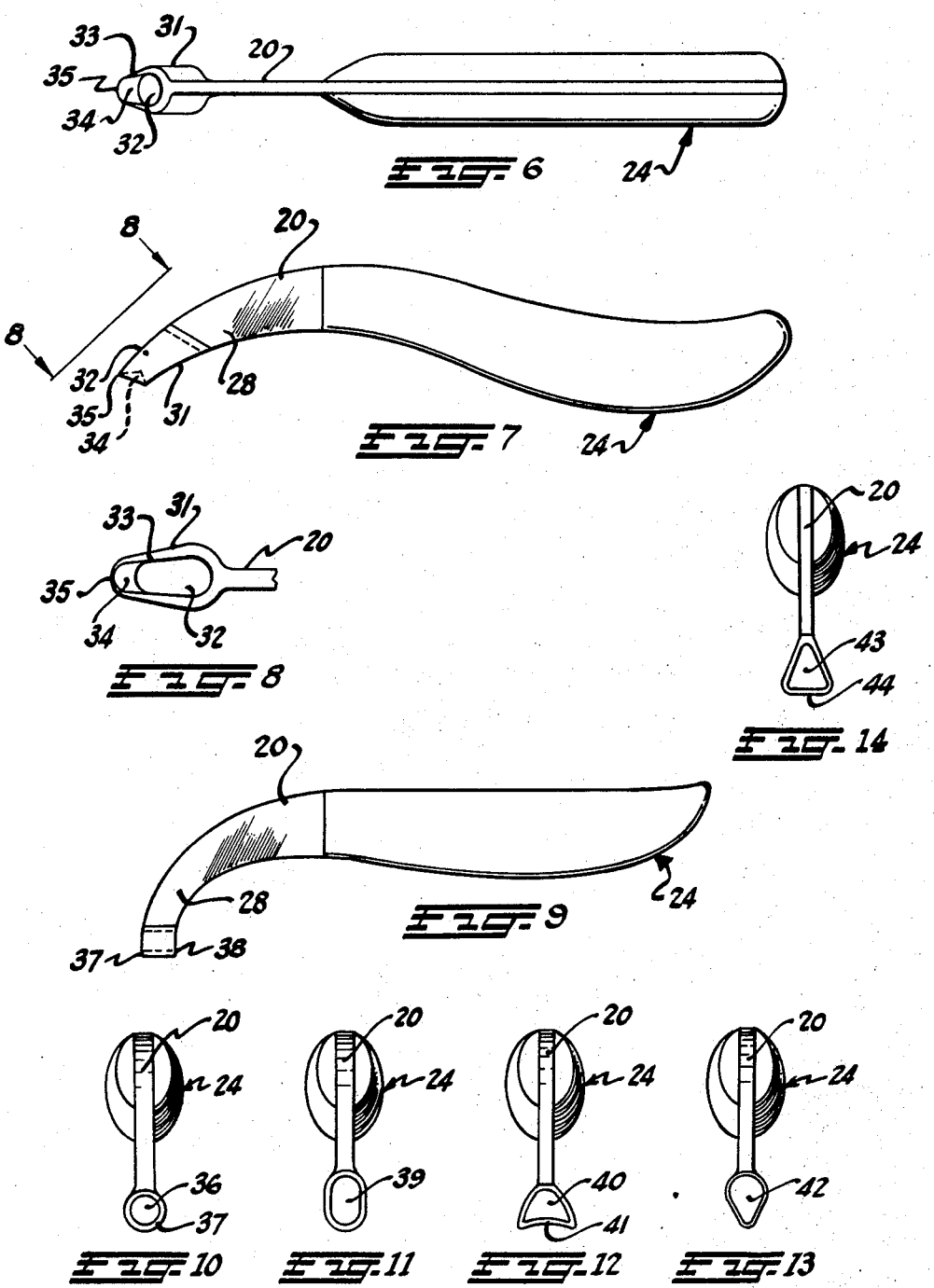

United States Patent Office 3,422,533
Patented Jan. 21, 1969

3,422,533
DENTAL PLATE KNIFE
Robert D. Keller, 163 Nueva Ave.,
Redwood City, Calif. 94061
Filed Aug. 22, 1966, Ser. No. 574,002
U.S. Cl. 30—278            7 Claims
Int. Cl. B26b *3/00*

ABSTRACT OF THE DISCLOSURE

A knife of improved construction having a blade secured at one end to a handle and provided with an opening therethrough at the opposite end thereof. A cutting edge is disposed on at least one side of the opening and the blade itself has longitudinal edges which are shaped to allow the cutting edge to reach relatively inaccessible areas for cutting or trimming purposes. The opening may have any one of a number of different configurations as desired.

This invention relates to knives, and more particularly to knives specially designed for dental platework and the like.

While any knife can of course be used for work on dental plates, the materials of which the plates are made makes it desirable for the knife to be scientifically designed in order to cope with the characteristics of the materials, and therefore expedite the work being done with the knife.

It is therefore the principal object of this invention to provide a dental plate knife of the character herein described, that is specially designed for work on dental plates by having cutting edges formed for scraping off the temporary soft plastic liner.

Another object of this invention is to provide a dental plate knife that is made from tool steel that is provided with a heat resistant handle.

Another object of this invention is to provide a dental plate knife that is provided with an opening through which the peelings or cutting of material will flow and thus not pile up in front of the blade.

Still another object of this invention is to provide a dental plate knife that can also be used for cutting similar materials in certain work in the electronic industry as will later on be described in some detail in this specification.

Figure 1:
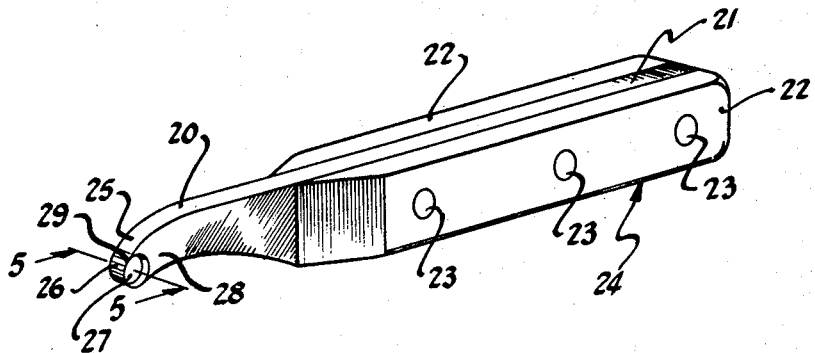
Figure 2:
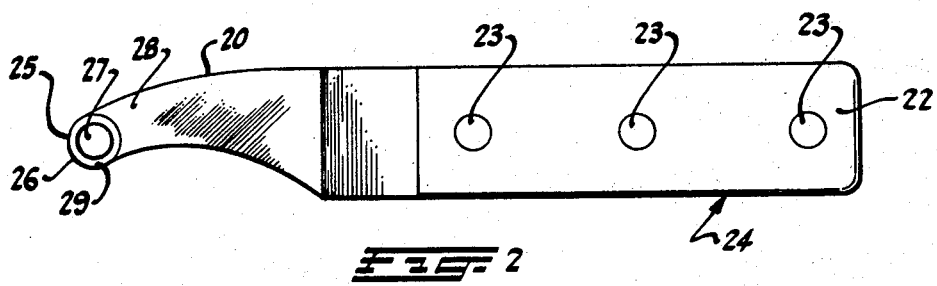
Figure 3:
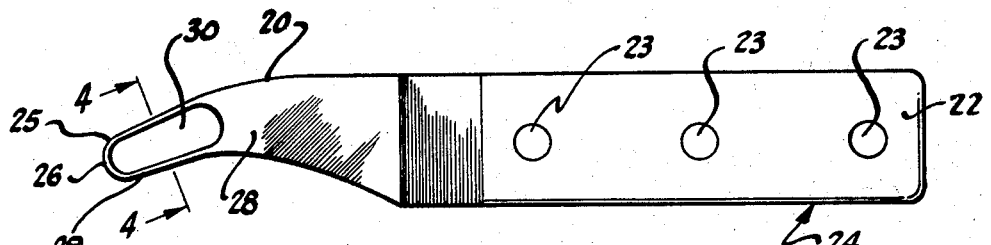
Figures 4, 5:
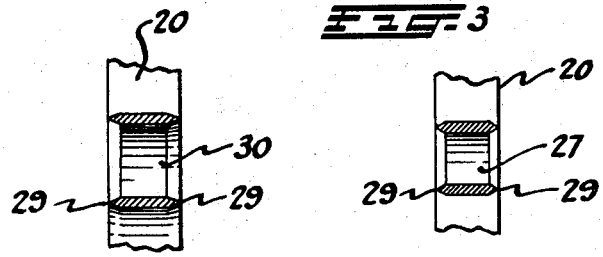

These and other objects will become apparent from the reading of the following specification and drawings, in which:

FIG. 1 is a pictorial view of one form of this invention.
FIG. 2 is a side view of FIGURE 1.
FIG. 3 is a side view of this invention having a modified form of cutting blade.
FIG. 4 is a sectional view of this invention taken substantially along line 4—4 of FIGURE 3 and viewed in the direction indicated by the arrows.
FIG. 5 is a sectional view of this invention taken substantially along line 5—5 of FIGURE 1 and viewed in the direction indicated by the arrows.
FIG. 6 is a top view of an optional form of this invention.
FIG. 7 is a side view of FIGURE 6.
FIG. 8 is a top view of that portion of FIGURE 7 that is indicated by the arrowed lines and numeral 8—8 slightly above FIGURE 7.
FIG. 9 is a side view of still another form of this invention.
FIG. 10 is a front view of FIGURE 9.
FIG. 11 is a front view of a modified form of the invention shown in FIGURE 9.
FIG. 12 is still another form of the invention illustrated in FIGURE 10.
FIG. 13 is still another form of the invention illustrated in FIGURE 10.
FIG. 14 is still another form of the invention illustrated in FIGURE 10.

In the drawings like details of this invention are indicated by like reference numbers throughout the different views of the invention.

Referring now to the drawings, and more particularly first to FIGURE 1, it will be seen that this invention comprises a flat steel blade 20 that has a rectangular end 21 which is secured between two heat resistant members 22 by means of a trio of spaced rivets 23 or their equivalent, thus forming the handle of this novel dental plate knife which is indicated in its entirety by the reference number 24.

The outer end 25 of the flat steel blade 20 of this invention is rounded at 26 as well as being provided with a circular opening 27 through the side 28 thereof. Looking now at FIGURE 5 it will be seen that the V-shaped cutting edges 29 are formed by the making of the aforesaid opening 27 in the outer end and on each side of the aforesaid flat steel blade 20 of this invention.

The configuration and construction of the modified form of this invention that is shown in FIGURES 3 and 4 of the drawings differ only from that shown in FIGURES 1, 2 and 5 by having an elongated opening 30 in place of the aforesaid circular opening 27.

Directing one's attention now to FIGURES 6 and 7 of the drawings, it will be seen that the knife 24 in this instance has a side configuration of a mild double curve, and that the outer end of the flat steel blade 20 terminates in a cutting edge 31 having an opening 32 which is at right angle to the aforesaid side 28, and that the enlarged head 33 is also at right angle to the aforesaid side 28, while the opening 32 provides the knife with a scoop-like member 34 whose outer edge 35 is part of the aforesaid cutting edge 31.

The form of the knife shown in FIGURES 9 and 10 is almost L-shaped when viewed from the side, and the opening 36 is basically parallel to the handle of the knife which in thus instance is provided with the cutting edges 37 and 38.

The form of the invention illustrated in FIGURES 11 to and including 14 differs only that the aforesaid enlarged head is provided with an elongated opening 39 in FIGURE 11, and a triangular-shaped opening 40 in FIGURE 12 in which instance the lowermost surface 41 is curved, and the opening 42 in that modified form of the invention shown in FIGURE 13 is heart-shaped, while the opening 43 shown in FIGURE 14 is triangular with a flat lower surface 44. It is noted that with the exception of the knife as shown in the first five figures of the drawings, that the enlarged head of the knife has the same basic configuration as does the opening through the head in order that a cutting edge may be formed.

One of the uses of this novel dental plate knife is to cut away the deeper part of the soft temporary plastic liner of the lower dentures, and the deep area of the upper dentures. The cutting edge 29 of the opening in the knife is normally chamfered about 60° in order to edge off radius, as well as to allow the peelings or cuttings to flow through the opening so they do not pile up in front of the blade of the knife. Cutting is done by a left or right sideway motion. This knife will, as anyone experienced in the art knows, have a big advantage over power operated devices or tools which bounce on the soft rubbery temporary liner of dentures.

The form of this invention as shown in FIGURE 12 is specially adapted for work on upper dentures by reason of its concaved lowermost surface 41, while the form shown in FIGURES 11, 13 and 14 is of value in the electronic industry for potting as will be understood by anyone experienced in this art who will also find many other uses for this knife which can be made in any desired size.

It is to be understood that this invention of mine is subject to any change in material, construction and/or configuration in so long as the changes fall within the scope and intent of the appended claims.

What I now claim as new and desire to secure by Letters Patent is:

1. A knife comprising: a blade having a pair of opposed ends and a pair of opposed, substantially flat, generally parallel sides extending between said ends; a handle secured to said blade adjacent to one end thereof; the blade having an opening therethrough adjacent to the opposite end thereof; each of said sides including a pair of spaced longitudinal edges extending from a location adjacent to said handle to a location adjacent to said opening, one of the longitudinal edges of each pair being convex and the other longitudinal edge of each pair being concave, each pair of longitudinal edges being convergent as said opening is approached, said blade having at least one cutting edge adjacent to and extending at least partially about said opening with the length of said cutting edge being sufficient to define a major portion of the corresponding boundary of said opening and with said cutting edge having a stretch disposed adjacent to and conforming with the outer surface of the opposite end of the blade and extending away from said opposite end on opposite sides of said opening.

2. A knife as set forth in claim 1, wherein the axis of the opening is substantially perpendicular to said sides and extends through the same.

3. A knife as set forth in claim 1, wherein said opening has a generally central axis therethrough, said sides of the blade being substantially parallel with a plane in which said axis is disposed.

4. A knife as set forth in claim 1, wherein said outer surface of said opposite end of the blade is arcuate.

5. A knife as set forth in claim 4, wherein said arcuate outer surface is convex.

6. A knife as set forth in claim 4, wherein said arcuate outer surface is concave.

7. A knife as set forth in claim 1, wherein said outer surface of said opposite end of the blade is flat, said stretch of said cutting edge being parallel with said flat outer surface.

References Cited

UNITED STATES PATENTS

| | | | |
|---|---|---|---|
| 826,266 | 7/1906 | Newman | 30—280 |
| 2,082,982 | 6/1937 | Schumacher | 30—279 X |
| 2,238,222 | 4/1941 | Jones | 30—280 |
| 2,677,843 | 5/1954 | Goodman | 15—236 |
| 1,624,136 | 4/1927 | Goldblatt | 30—280 |
| 339,542 | 4/1886 | Gates | 30—279 |
| 509,899 | 12/1893 | Heysinger | 30—279 X |
| 1,374,167 | 4/1921 | Warren | 30—279 |
| 1,739,517 | 12/1929 | O'Loughlin | 30—279 |
| 2,210,769 | 8/1940 | Murker | 30—279 |

JAMES L. JONES, JR., *Primary Examiner.*

U.S. Cl. X.R.

30—314